United States Patent
Dasari et al.

(10) Patent No.: US 7,681,118 B1
(45) Date of Patent: Mar. 16, 2010

(54) METHODS AND APPARATUS FOR CREATING MARKUP LANGUAGE DOCUMENTS

(75) Inventors: Srinivas Dasari, Scottsdale, AZ (US); Kevin T. Harvey, Phoenix, AZ (US); Cathy Sockrider, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 139 days.

(21) Appl. No.: 10/906,020

(22) Filed: Jan. 31, 2005

Related U.S. Application Data

(60) Provisional application No. 60/587,702, filed on Jul. 14, 2004.

(51) Int. Cl.
G06F 17/00 (2006.01)
G06F 3/00 (2006.01)

(52) U.S. Cl. .................. 715/234; 715/760; 715/235

(58) Field of Classification Search .............. 715/513, 715/760, 234, 235
See application file for complete search history.

(56) References Cited

U.S. PATENT DOCUMENTS 6,687,873 B1 * 2/2004 Ballantyne et al. .......... 715/500

(Continued)

OTHER PUBLICATIONS

Enterprise COBOL for z/OS Language Reference, version 3, release 3, Feb. 2004, pp. 451-455.

IBM, "IBM Enterprise COBOL for z/OS Language Reference", Version 3, Release 3, Third Edition, published Feb. 2004, pp. 229-455.

(Continued)

*Primary Examiner*—Tadesse Hailu
*Assistant Examiner*—Nicholas S Ulrich
(74) *Attorney, Agent, or Firm*—Snell & Wilmer L.L.P.

(57) ABSTRACT

A method for generating markup language documents, e.g., XML documents, uses a code generator that creates programs configured to create dynamic XML documents at run time, avoiding many of the complexities arising from the use of conventional "XML GENERATE" statements. In one embodiment, this process involves (1) creating a template document using a markup language, wherein the template document includes a set of tags associated with the markup language documents; (2) parsing the template document to determine a working storage structure corresponding to the tags in the template document; and (3) generating an application program in the programming language (e.g., COBOL), wherein the application program includes a definition of the working storage structure, and is configured to generate, during run-time, a markup language document corresponding to the original template document.

10 Claims, 13 Drawing Sheets

U.S. PATENT DOCUMENTS

| | | | | |
|---|---|---|---|---|
| 6,947,945 | B1* | 9/2005 | Carey et al. | 707/102 |
| 6,985,910 | B2* | 1/2006 | Hollingsworth | 707/102 |
| 7,114,148 | B2* | 9/2006 | Irving et al. | 717/121 |
| 7,117,504 | B2* | 10/2006 | Smith et al. | 719/328 |
| 7,174,327 | B2* | 2/2007 | Chau et al. | 707/3 |
| 2001/0044811 | A1* | 11/2001 | Ballantyne et al. | 707/513 |
| 2002/0073118 | A1* | 6/2002 | Costigan et al. | 707/513 |
| 2002/0143816 | A1* | 10/2002 | Geiger et al. | 707/513 |
| 2003/0005410 | A1 | 1/2003 | Harless et al. | |
| 2004/0148612 | A1* | 7/2004 | Olsen | 719/328 |
| 2004/0168124 | A1* | 8/2004 | Beisiegel et al. | 715/513 |
| 2004/0221292 | A1* | 11/2004 | Chiang et al. | 719/310 |
| 2005/0138606 | A1* | 6/2005 | Basu et al. | 717/136 |
| 2005/0155016 | A1* | 7/2005 | Bender | 717/106 |

OTHER PUBLICATIONS

Kjell, "Chapter 47—Common Array Algorithms," Central Connecticut State University, latest revision of publication on May 27, 2003, pp. 1-7, http://www.kiv.zcu.cz/~ledvina/vyuka/Java/javanotes/Notes/chap47/ch47_1.html.

Kjell, "Introduction to Computer Science using Java," Central Connecticut State University, Jul. 2003, pp. 1-2, http://www.kiv.zcu.cz/~ledvina/vyuka/Java/javanotes/cs151java.html.

* cited by examiner

```
---------------------------------------------------------------------------
| XMLGEN    Source Code Geneartion for XML Output   USERID 04/06/09 12:03
|           -------------------------------------------
|
|
| Input XML file     :  MSSS.GEN.REPXML.SUPST_____    /— 302
|
| Output Source File :  MSSS.XML.TEST_____ (PDS)  ⎤
|         Member :    SUPSTXMO_____         ⎬— 304
|       XML Body Tag: DOCUMENT_____         ⎥
|       System id   : SE                                   ⎦
|
| (Provide Fully qualified name without quotes)
|---------------------------------------------------------------------------
|
|  1. Generate XML Copy book                               ⎤
|                                                          ⎥
|  2. Edit XML copybook to provide arrays/field lengths    ⎬— 306
|                                                          ⎥
|  3. Generate XML Reply API                               ⎦
|
|     (Select Option or PF3 for Exit)
|
|
```

Fig. 3

```
START-OF-DOCUMENT          Entire XML document
VERSION-INFORMATION        1.0
ENCODING-DECLARATION       UTF-8
START-OF-ELEMENT           Document
ATTRIBUTE-NAME             DocumentId
ATTRIBUTE-CHARACTERS       XXX
ATTRIBUTE-NAME             Version
ATTRIBUTE-CHARACTERS       1
ATTRIBUTE-NAME             subVersion
ATTRIBUTE-CHARACTERS       2
CONTENT-CHARACTERS
START-OF-ELEMENT           Header
CONTENT-CHARACTERS
START-OF-ELEMENT           TransactionBlk
CONTENT-CHARACTERS START-OF-ELEMENT           MsgExpireTime
CONTENT-CHARACTERS         3000
END-OF-ELEMENT             MsgExpireTime
CONTENT-CHARACTERS
START-OF-ELEMENT           RepQNm
START-OF-CDATA-SECTION     <!:CDATA:
CONTENT-CHARACTERS         &%$#@ test qname
END-OF-CDATA-SECTION       ::>
END-OF-ELEMENT             RepQNm
CONTENT-CHARACTERS
END-OF-ELEMENT             TransactionBlk
END-OF-ELEMENT             Header
START-OF-ELEMENT           Body
CONTENT-CHARACTERS
START-OF-ELEMENT           Request
CONTENT-CHARACTERS
START-OF-ELEMENT           AcctNo
CONTENT-CHARACTERS         457561
END-OF-ELEMENT             AcctNo
CONTENT-CHARACTERS
END-OF-ELEMENT             Request
END-OF-ELEMENT             Body
END-OF-ELEMENT             Document
EXCEPTION
```

Fig. 5

```
1.   <?xml version="1.0" encoding="UTF-8"?>
2.   <Document DocumentId="XXX" Version="1"
     subVersion="2">
3.   <Header>
4.   <TransactionBlk>
5.     <MsgExpireTime>3000</MsgExpireTime>
6.     <RepQNm><![CDATA[&%$#@ test qname]]></RepQNm>
7.   </TransactionBlk>
8.   </Header>
9.   <Body>
10.  <Request>
11.    <AcctNo>457561</AcctNo>
12.  </Request>
13.  </Body>
14.  </Document>
```

Fig. 6

```
0001   01      XML-DOCUMENT.
0002         05                                          PIC X(006)
0003                       VALUE '<?xml '.
0004         05                                          PIC X(014)
0005                       VALUE 'version="1.0" '.
0006         05                                          PIC X(017)
0007                       VALUE 'encoding="UTF-8" '.
0008         05                                          PIC X(002)
0009                       VALUE '?>'.
0010         05            GRP-DOCUMENT.
0011           10                                        PIC X(009)
0012                       VALUE '<Document'.
0013           10                                        PIC X(012)
0014                       VALUE ' DocumentId='.
0015           10                                        PIC X(001)
0016                       VALUE '"'.
0017           10          ATR-DOCUMENTID               PIC X(003)
0018                       VALUE ' '.
0019           10                                        PIC X(001)
0020                       VALUE '"'.
0021           10                                        PIC X(009)
0022                       VALUE ' Version='.
0023           10                                        PIC X(001)
0024                       VALUE '"'.
0025           10          ATR-VERSION                  PIC X(001)
0026                       VALUE ' '.
0027           10                                        PIC X(001)
0028                       VALUE '"'.
0029           10                                        PIC X(012)
0030                       VALUE ' subVersion='.
0031           10                                        PIC X(001)
0032                       VALUE '"'.
0033           10          ATR-SUBVERSION               PIC X(001)
0034                       VALUE ' '.
0035           10                                        PIC X(001)
0036                       VALUE '"'.
0037           10                                        PIC X(001)
0038                       VALUE '>'.
0039           10          GRP-HEADER.
0040             15                                      PIC X(007)
0041                       VALUE '<Header'.
0042             15                                      PIC X(001)
0043                       VALUE '>'.
0044             15        GRP-TRANSACTIONBLK.
0045               20                                    PIC X(015)
0046                       VALUE '<TransactionBlk'.
0047               20                                    PIC X(001)
0048                       VALUE '>'.
0049               20      GRP-MSGEXPIRETIME.
0050                 25                                  PIC X(014)
0051                       VALUE '<MsgExpireTime'.
0052                 25                                  PIC X(001)
0053                       VALUE '>'.
```

Fig. 7A

```
0054            25      XML-MSGEXPIRETIME        PIC X(004)
0055                      VALUE '    '.
0056            25                               PIC X(016)
0057                      VALUE '</MsgExpireTime>'.
0058            20      GRP-REPQNM.
0059            25                               PIC X(007)
0060                      VALUE '<RepQNm'.
0061            25                               PIC X(001)
0062                      VALUE '>'.
0063            25                               PIC X(009)
0064                      VALUE '<![CDATA['.
0065            25      XML-REPQNM               PIC X(016)
0066                      VALUE '                '.
0067            25                               PIC X(003)
0068                      VALUE ']]>'.
0069            25                               PIC X(009)
0070                      VALUE '</RepQNm>'.
0071            20                               PIC X(017)
0072                      VALUE '</TransactionBlk>'.
0073       15                                    PIC X(009)
0074                      VALUE '</Header>'.
0075    10         GRP-BODY.
0076       15                                    PIC X(005)
0077                      VALUE '<Body'.
0078       15                                    PIC X(001)
0079                      VALUE '>'.
0080       15      GRP-REQUEST.
0081            20                               PIC X(008)
0082                      VALUE '<Request'.
0083            20                               PIC X(001)
0084                      VALUE '>'.
0085            20      GRP-ACCTNO.
0086            25                               PIC X(007)
0087                      VALUE '<AcctNo'.
0088            25                               PIC X(001)
0089                      VALUE '>'.
0090            25      XML-ACCTNO               PIC X(006)
0091                      VALUE '      '.
0092            25                               PIC X(009)
0093                      VALUE '</AcctNo>'.
0094            20                               PIC X(010)
0095                      VALUE '</Request>'.
0096       15                                    PIC X(007)
0097                      VALUE '</Body>'.
0098    10                                       PIC X(011)
0099                      VALUE '</Document>'.
```

Fig. 7B

```
                                          XMLgen_sample_procedure1.txt
       IDENTIFICATION DIVISION.
       PROGRAM-ID. SAMPXMO  IS INITIAL.
       AUTHOR. XMLGEN.
       DATE-WRITTEN. 11/2004.
       DATE-COMPILED.
       ENVIRONMENT DIVISION.
       INPUT-OUTPUT SECTION.
       FILE-CONTROL.
       DATA DIVISION.
       FILE SECTION.

WORKING-STORAGE SECTION.

01  FILLER                          PIC X(40)   VALUE
           '*SAMPXMO WS STARTS HERE*'.
       01  WS-INDEXES.
           05   WS-1                       PIC S9(07) COMP.
           05   WS-2                       PIC S9(07) COMP.
           05   WS-3                       PIC S9(07) COMP.
           05   WS-LAST-NON-BLANK-INDEX    PIC S9(07) COMP.
           05   WS-CDATA-START-INDEX       PIC S9(07) COMP.

01   XML-DOCUMENT.
            05                                          PIC X(006)
                         VALUE '<?xml '.
            05                                          PIC X(014)
                         VALUE 'version="1.0" '.
            05                                          PIC X(017)
                         VALUE 'encoding="UTF-8" '.
            05                                          PIC X(002)
                         VALUE '?>'.
            05           GRP-DOCUMENT.
                 10                                     PIC X(009)
                         VALUE '<Document'.
                 10                                     PIC X(012)
                         VALUE ' DocumentId='.
                 10                                     PIC X(001)
                         VALUE '"'.
                 10      ATR-DOCUMENTID                 PIC X(003)
                         VALUE 'XXX'.
                 10                                     PIC X(001)
                         VALUE '"'.
                 10                                     PIC X(009)
                         VALUE ' version='.
                 10                                     PIC X(001)
                         VALUE '"'.
                 10      ATR-VERSION                    PIC X(001)
                         VALUE '1'.
                 10                                     PIC X(001)
                         VALUE '"'.
                 10                                     PIC X(012)
                         VALUE ' subversion='.
                 10                                     PIC X(001)
                         VALUE '"'.
                 10      ATR-SUBVERSION                 PIC X(001)
                         VALUE '2'.
                 10                                     PIC X(001)
                         VALUE '"'.
                 10                                     PIC X(001)
                         VALUE '>'.
                 10      GRP-HEADER.
                    15                                  PIC X(007)
                            VALUE '<Header'.
                    15                                  PIC X(001)
                            VALUE '>'.
                    15      GRP-TRANSACTIONBLK.
                       20                               PIC X(015)
                               VALUE '<TransactionBlk'.
                       20                               PIC X(001)
                               VALUE '>'.
                       20      GRP-MSGEXPIRETIME.
                          25                            PIC X(014)
                                  VALUE '<MsgExpireTime'.
                          25                            PIC X(001)
                                  VALUE '>'.
                          25   XML-MSGEXPIRETIME        PIC X(004)
                                  VALUE '3000'.
                          25                            PIC X(016)
```

FIG. 10A

```
                                  XMLgen_sample_procedure1.txt
                    VALUE '</MsgExpireTime>'.
        20      GRP-REPQNM.
           25                                          PIC X(007)
                    VALUE '<RepQNm'.
           25                                          PIC X(001)
                    VALUE '>'.
           25                                          PIC X(009)
                    VALUE '<![CDATA['.
           25   XML-REPQNM                             PIC X(016)
                    VALUE '&&$#@ test qname'.
           25                                          PIC X(003)
                    VALUE ']]>'.
           25                                          PIC X(009)
                    VALUE '</RepQNm>'.
        20                                             PIC X(017)
                    VALUE '</TransactionBlk>'.
     15                                                PIC X(009)
                VALUE '</Header>'.
  10      GRP-BODY.
     15                                                PIC X(005)
                VALUE '<Body'.
     15                                                PIC X(001)
                VALUE '>'.
     15      GRP-REQUEST.
        20                                             PIC X(008)
                    VALUE '<Request'.
        20                                             PIC X(001)
                    VALUE '>'.
        20      GRP-ACCTNO.
           25                                          PIC X(007)
                    VALUE '<AcctNo'.
           25                                          PIC X(001)
                    VALUE '>'.
           25   XML-ACCTNO                             PIC X(006)
                    VALUE '457561'.
           25                                          PIC X(009)
                    VALUE '</AcctNo>'.
        20                                             PIC X(010)
                    VALUE '</Request>'.
     15                                                PIC X(007)
                VALUE '</Body>'.
  10                                                   PIC X(011)
            VALUE '</Document>'.
01 XML-DOC-A
    REDEFINES
    XML-DOCUMENT.
    05  XML-CHAR OCCURS 289 PIC X(1).
LINKAGE SECTION.
 01 LS-XML-OUT-BODY.
    05          LS-GRP-DOCUMENT.
    10              LS-ATR-DOCUMENTID           PIC X(003).
    10              LS-ATR-VERSION              PIC X(001).
    10              LS-ATR-SUBVERSION           PIC X(001).
    10              LS-GRP-HEADER.
      15              LS-GRP-TRANSACTIONBLK.
        20              LS-GRP-MSGEXPIRETIME.
           25              LS-XML-MSGEXPIRETIME PIC X(004).
        20              LS-GRP-REPQNM.
           25              LS-XML-REPQNM        PIC X(016).
    10          LS-GRP-BODY.
      15              LS-GRP-REQUEST.
        20              LS-GRP-ACCTNO.
           25              LS-XML-ACCTNO        PIC X(006).

01 LS-XML-OUT-REC.
    05   LS-XML-OUT-LENGTH       PIC S9(07) COMP.
    05   LS-XML-OUT-AREA.
         10 LS-XML-OUT-CHAR   OCCURS 289 PIC X.

PROCEDURE DIVISION USING LS-XML-OUT-BODY,
                         LS-XML-OUT-REC.
      MOVE  LS-ATR-DOCUMENTID
        TO  ATR-DOCUMENTID.
      MOVE  LS-ATR-VERSION
        TO  ATR-VERSION.
      MOVE  LS-ATR-SUBVERSION
        TO  ATR-SUBVERSION.
      MOVE  LS-XML-MSGEXPIRETIME
        TO  XML-MSGEXPIRETIME.
```

Page 2

Fig. 10B

```
              MOVE  LS-XML-REPQNM              XMLgen_sample_procedure1.txt
                TO  XML-REPQNM.
              MOVE  LS-XML-ACCTNO
                TO  XML-ACCTNO.

*----------------------------------------------------------------
      * THIS WILL COPY THE WORKING STORAGE XML TO THE LINKAGE AREA.
      * WHEN AN ARRAY OCCURENCE IS NOT POPULATED (FROM ABOVE LOGIC),
      * HIGH-VALUES ARE MOVED TO WORKING STORAGE. THIS LOGIC BELOW
      * FILTERS THESE TAGS FROM THE OUTPUT LINKAGE AREA.
      *----------------------------------------------------------------
      *!? CAUTION:
      *!! IF THE DRIVER DOESN'T PASS ENOUGH LENGTH FOR OUTPUT
      *!! XML AREA, THIS LOGIC CAN GIVE SOC4 OR SOC1 ERROR
      *----------------------------------------------------------------
              MOVE  0  TO  LS-XML-OUT-LENGTH
                           WS-LAST-NON-BLANK-INDEX.
              PERFORM VARYING WS-1  FROM  1
                                    BY    1
                    UNTIL WS-1  >   289
                  IF  XML-CHAR (WS-1) = '<'
                      MOVE WS-LAST-NON-BLANK-INDEX
                          TO  LS-XML-OUT-LENGTH
                  END-IF
                  IF  XML-CHAR (WS-1) NOT = LOW-VALUES
                      ADD  1  TO  LS-XML-OUT-LENGTH
                      MOVE XML-CHAR (WS-1) TO
                         LS-XML-OUT-CHAR (LS-XML-OUT-LENGTH)
                      IF  XML-CHAR (WS-1) NOT = ' '
                          MOVE LS-XML-OUT-LENGTH  TO
                               WS-LAST-NON-BLANK-INDEX
                      END-IF
                  END-IF
              END-PERFORM.

GOBACK.
          1000-MAIN-EXIT.
              EXIT.
```

Page 3

METHODS AND APPARATUS FOR CREATING MARKUP LANGUAGE DOCUMENTS

CROSS-REFERENCE TO RELATED APPLICATIONS

This application claims priority to, and the benefit of, U.S. Provisional Application Ser. No. 60/587,702, filed Jul. 14, 2004, and entitled "System and Method to Facilitate Creating Dynamic XML Documents in COBOL" which is hereby incorporated by reference.

FIELD OF INVENTION

The present invention generally relates to the generation and processing of markup-language documents (e.g., extensible markup language (XML) documents) using traditional procedural programming languages (e.g., COBOL and the like).

BACKGROUND OF INVENTION

Many organizations have discovered that the cost, effort, and risk to replace older legacy systems with modern software and database systems are overwhelming. Rather, many organizations continue to place an emphasis on supporting legacy systems by bridging gaps between old and new computing technologies, wherein bridging the gap often includes modification of existing legacy data and programming languages.

COBOL is one such programming language. Despite the existence of modern, object-oriented programming languages and Internet-based applications, COBOL will likely remain a vital part of many organizations' computing centers. Traditional COBOL, however, lacks some of the flexibility of modern languages, such as the ability to read extensible markup language (XML) documents.

XML resembles Hypertext Markup Language (HTML) in appearance and structure; however, XML is functionally different: HTML specifies how to display data, while XML is used to describe data. Accordingly, XML has provided developers with a means for displaying different types of data in a consistent manner. Generally, a developer may create formatting instructions within a data type definition (DTD) file. When a data type is defined, a developer need only add an XML tag within an HTML document which corresponds to a tag in the DTD.

Because COBOL is a legacy programming language, it must often be retrofitted to support various functionality relating to newer computing technologies. Technologies such as XML were not designed with older computing technologies such as COBOL in mind. Modifying the language or creating add-on products most often results in extra layers of sophistication and complexity for the developer. One such example is "XML GENERATE," which is a function included within IBM® Enterprise COBOL. While XML GENERATE provides an effective means to generate and process various types of XML, the generated XML is limited by the input data structure of the COBOL code both in it's structure and in tag names. Further, it typically requires the creation of complex COBOL structures that mimic XML data structures. Enhancing this generated XML to bring it to an installation XML standard requires further processing of this XML.

SUMMARY OF INVENTION

In general, the invention provides a method for facilitating the generation of markup language documents, e.g., XML documents, through the use of a code generator that creates programs configured to create dynamic XML documents at run time, while minimizing or avoiding many of the prior art complexities. In one embodiment, the method of the present invention involves (1) creating a sample document using the markup language, wherein the sample document includes a set of tags associated with the markup language documents; (2) parsing the sample document to determine a working storage structure corresponding to the tags in the sample document; and (3) generating an application program in the programming language (e.g., COBOL), wherein the application program is configured to generate, during run-time, the markup language documents corresponding to the working storage structure.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIG. 3 illustrates an exemplary user interface to the XML Generation tool;

FIG. 5 is an exemplary list of XML events and XML texts triggered by the XML Parse statement;

FIG. 6 is an exemplary XML document used to detail what the associated generated COBOL copybook would resemble;

FIGS. 7A and 7B show an exemplary COBOL data structure generated for the exemplary XML document detailed in FIG. 6;

FIGS. 10A-C show an exemplary COBOL procedure division for generating an XML document including the associated linkage section that a calling program uses for passing parameters to this generated API.

DETAILED DESCRIPTION

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention.

Figure 1:
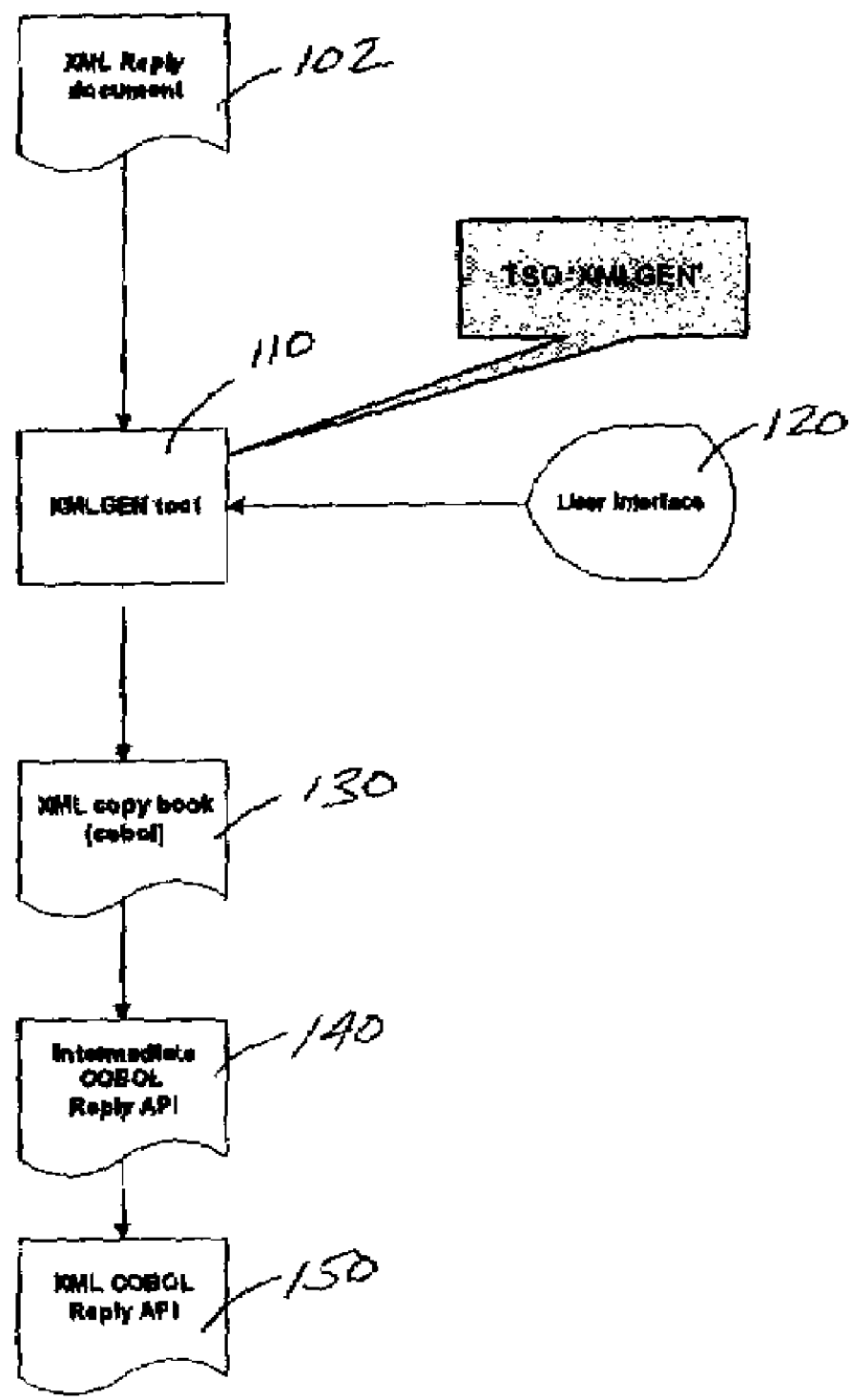
FIG. 1 is a schematic overview of an exemplary system in accordance with the present invention.

FIG. 1 shows an overview of an exemplary process that a programmer would take to use the invention. As shown, in an exemplary embodiment, an XML template Document 102 is fed into the XML GEN tool 110, which may be controlled via a suitable user interface 120. The XML GEN tool 110 then creates a suitable COBOL copybook 130, which is then used to create an intermediate COBOL reply application programming interface (API) 140 and a final XML COBOL Reply API 150. The latter may then be used to create XML documents corresponding in structure to that of document 102.

Figure 2:
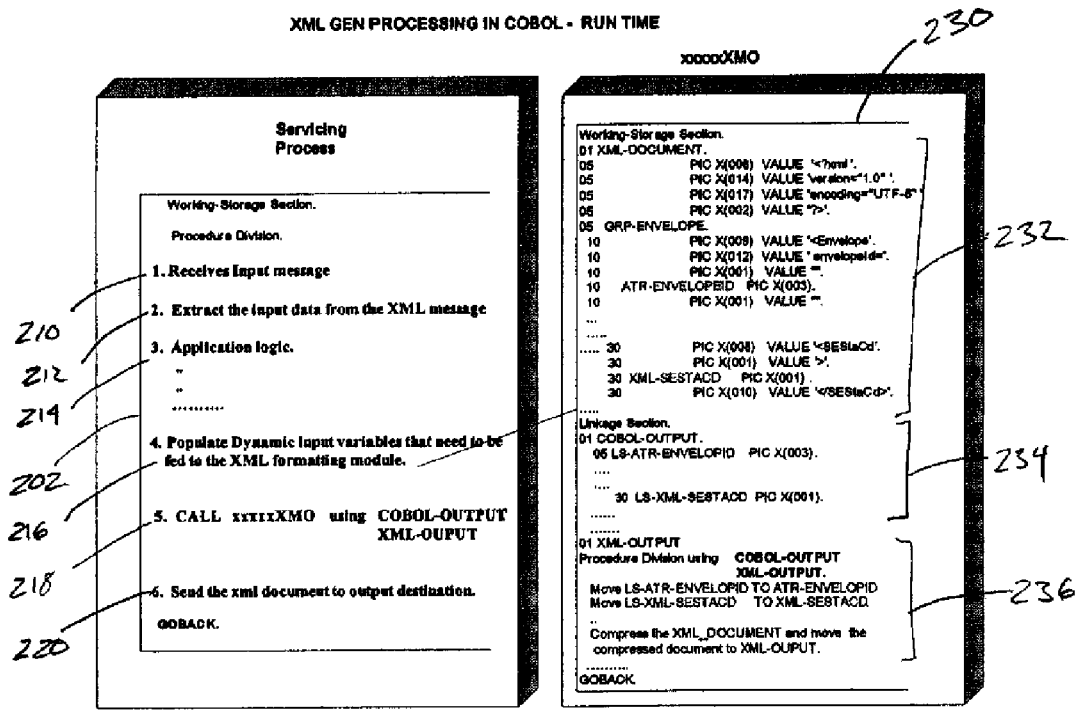
FIG. 2 illustrates exemplary run-time processing of an exemplary XML message.

FIG. 2 illustrates run-time processing of an exemplary XML document by a COBOL program (servicing process) using the API from FIG. 1 150. As shown, the COBOL program 202 receives an input message (210), then extracts the input data from the XML message (212). After the application logic section (214), the dynamic input variables are populated (216).

The procedure (218) then calls the appropriate XML code 230 (the generated code from FIG. 1, item 150), wherein the creation process is covered in detail below. The API (which in the illustrated embodiment is named "xxxxxXMO"), includes previously-created working storage section 232, linkage section 234, and procedure division 236 used to generate the XML code. Finally, the resulting XML document is sent to the output destination (220).

Figure 4:
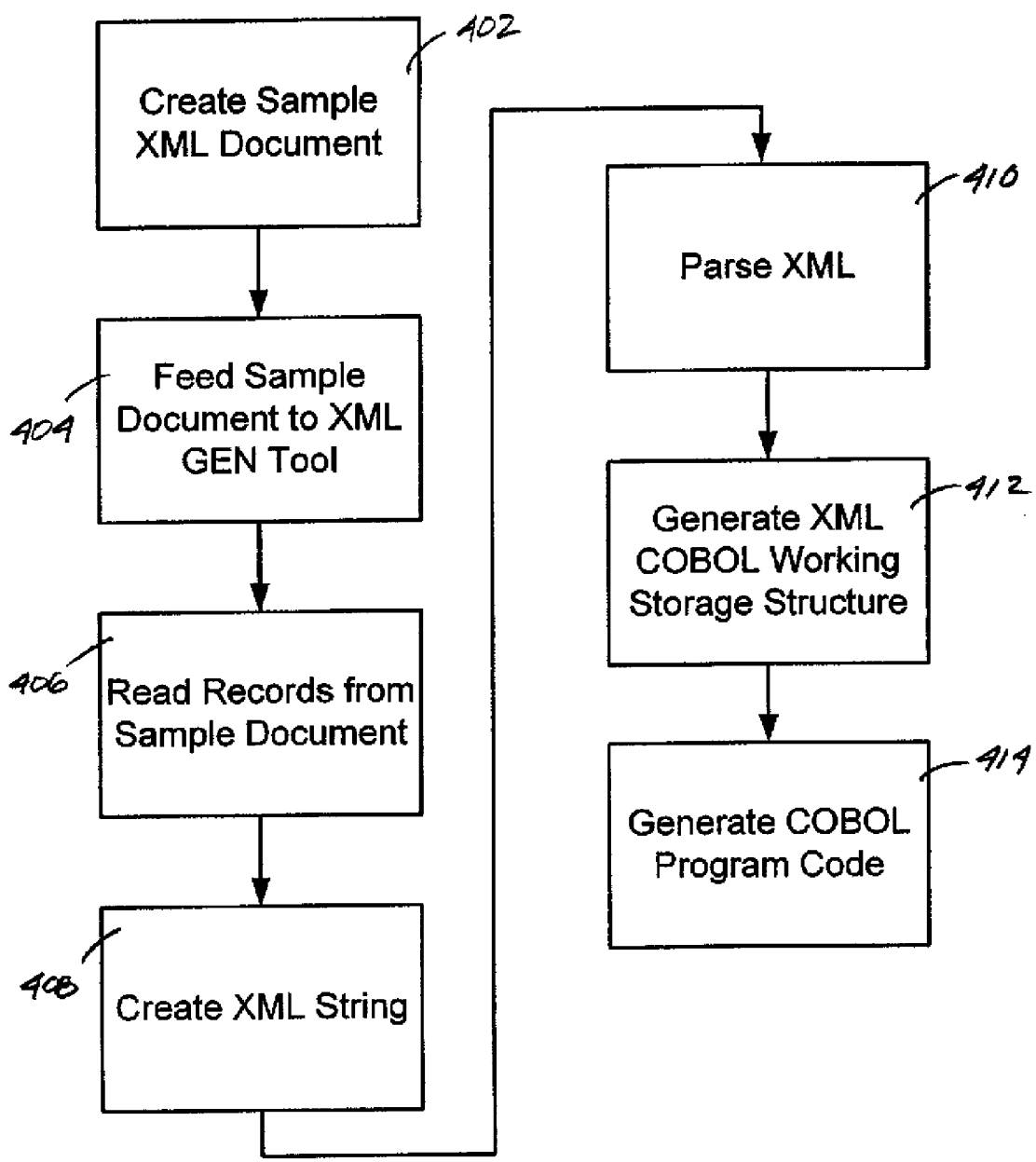
FIG. 4 depicts an exemplary method of the steps a programmer would take to utilize the present invention.

Referring now to FIG. 4, an overview of an exemplary method will now be described, and a more detailed description is provided thereafter. Initially, in step 402, a template XML document is created which includes substantially all possible tags, both optional and mandatory, that are likely to be encountered in the particular context. The tags may be populated, for example, with sample values that represent the maximum length of the tag and may be repeated to represent multiple occurrences. Any tags that are not dynamic in nature can be omitted; i.e., any static data is automatically returned. Alternatively, using a user interface, the developer can adjust the field lengths and array sizes as desired. In the illustrated embodiment, the system uses the maximum lengths.

The various tags used in XML documents are known in the art, and are covered in a variety of language specifications and developer publications. See, e.g., Elliotte Harold, XML: Extensible Markup Language (IDG, 1998), which is hereby incorporated by reference.

With momentary reference to FIG. 3, a typical user interface may appear as shown, including a region 302 for selecting the appropriate XML file, a region 304 for specifying the name and attributes of the output source file, and various options 306 for generating and editing the appropriate copybooks and API code. It will be appreciated that a variety of user interfaces may be employed, and that the illustrated interface is not intended to be limiting.

Referring once again to FIG. 4, in step 404, the template XML document is fed into the XML GEN tool. This may be completed, for example, via the user interface just described, or may be completed automatically. Steps 406 through 414 all occur in the XML Gen tool.

In steps 406-408, the XML Gen tool then reads records from the template XML document and creates a corresponding XML string. A suitable parsing statement is then used to parse the XML string, e.g., the IBM COBOL "XML Parse" statement (step 410). For a description of the IBM COBOL "XML Parse" statement, see, e.g., IBM Enterprise COBOL Language Reference, Version 3, Release 3, Third Ed. (February 2004), which is hereby incorporated by reference.

Next, in step 412, the XML Gen tool intercepts the various XML events, and generates the XML COBOL working storage structure that is used later. The various XML events that are intercepted are described in further detail below.

In step 414, the system generates suitable COBOL procedure division statements (e.g., program code) to fill each tag or attribute with a corresponding value received from the fixed format input of the linkage section. This may be completed, for example, using ISPF edit macros and static code snippets. With the program code generated in step 414, subsequent XML documents may be processed as described above in conjunction with FIG. 2.

Having thus given on overview of the illustrated method, a detailed discussion of the various procedures will now be discussed. In steps 410 and 412, the system parses the XML by intercepting various XML events and generating the corresponding COBOL working storage structure.

In step 410, the XML is suitably parsed such that each event of 'START-OF-ELEMENT', and 'ATTRIBUTE-NAME' are used to generate a filler field with the appropriate length to have a value clause of the element name or attribute name. Similarly, each event of CONTENT-CHARACTERS and CONTENT-CHARACTER will generate a COBOL variable with appropriate length. The group tags are given COBOL variable names of GRP-xxxx, the tags that have content are given variable names of XML-xxxx with appropriate length, and the attribute tags are given variable names of ATR-xxxx with appropriate length, where xxxx represents the tag name or attribute name. Empty CONTENT-CHARACTERS are ignored. In a preferred embodiment, the template XML represents all possible tag values.

With respect to the naming conventions described above, it will be appreciated that any suitable convention and combination of characters may be used, and that variable names given above are merely examples, and are in no way limiting.

The START-OF-CDATA-SECTION and END-OF-CDATA-SECTION events preferably generate COBOL filler fields with corresponding value clauses to represent CDATA For general information related to CDATA and other such items, see, e.g., Elliotte Harold, XML: Extensible Markup Language (1998). Similarly, the END-OF-EVENT generates closing filler fields that represent closing tags such as '>'. Additional standard XML events that are intercepted include:

'START-OF-DOCUMENT'
'VERSION-INFORMATION'
'ENCODING-DECLARATION'
'STANDALONE-DECLARATION'
'DOCUMENT-TYPE-DECLARATION'
'COMMENT'
'PROCESSING-INSTRUCTION-TARGET'
'PROCESSING-INSTRUCTION-DATA'
'END-OF-DOCUMENT'
'EXCEPTION'

If there is a parsing error that is not fatal, i.e. where the XML error code is either between 49 and 100, or between 299 and 500, in one embodiment, the system ignores the error and continues parsing the XML.

FIG. 6 depicts a sample XML document and FIG. 5 depicts the sequence of XML events and XML texts triggered by the XML Parse statement for the XML.

As mentioned above, an exemplary COBOL copybook generator program is developed to parse the XML and intercept the events described above in order to create the corresponding COBOL data structure. FIGS. 7A and 7B show the exemplary COBOL data structure generated from the sample XML shown in FIG. 6.

For example, the chart below shows the XML events and the corresponding Cobol copybook statements created for the tag <MsgExpireTime>3000</MsgExpireTime> of line 5 in FIG. 6.

| XML Event | XML Text | Cobol statement line# from FIGS. 7A, 7B |
|---|---|---|
| START-OF-ELEMENT | MsgExpireTime | Line 0049, 0050, 0051, 0052, 0053 |
| CONTENT-CHARACTERS | 3000 | Line 0054, 0055 |
| END-OF-ELEMENT | MsgExpireTime | Line 0056, 0057 |

Figure 8:
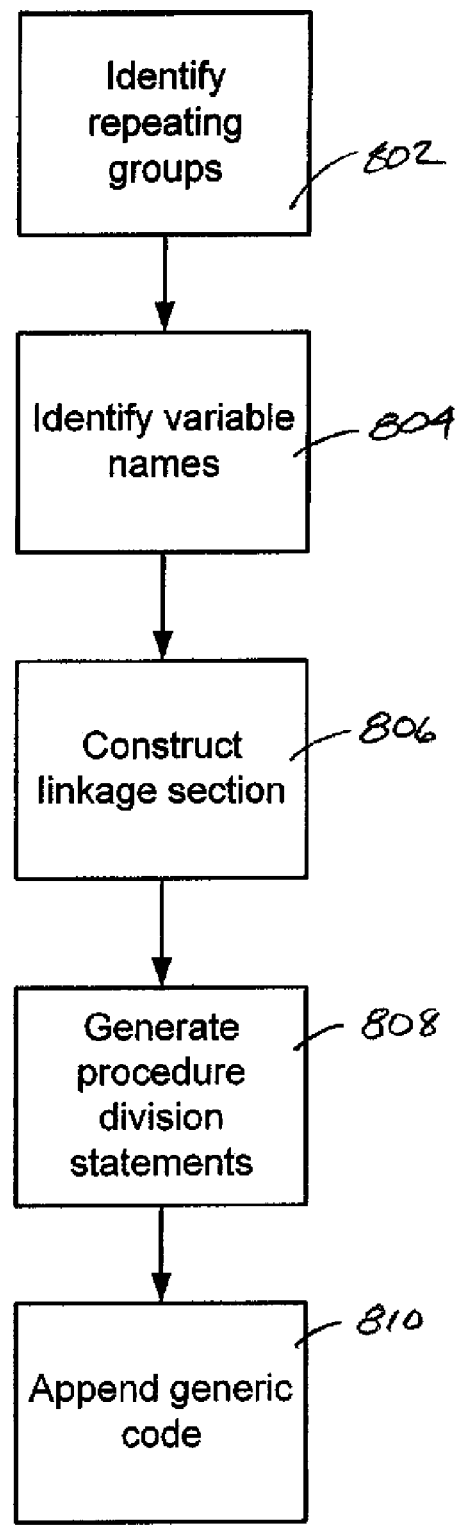
FIG. 8 depicts an exemplary code generation method.

FIG. 8 further details item 414 of FIG. 4 and depicts a method of generating the final COBOL program given the data structure previously determined (item 412 of FIG. 4). This step may be performed using a series of edit macros (e.g., ISPF edit macros), but may also be performed using other methods as well. The complete procedure division statements generated for the XML in FIG. 6 are shown in FIG. 10.

Initially, in step 802, an edit macro examines the copybook and identifies repeating groups. The repeated occurrences are deleted and the number of occurrences are reflected in the array size by the OCCURS clause. As described above, the user may adjust the field lengths and array sizes using, for example, the aforementioned user interface.

Next, in step 804, all variable names from the data structure (copybook) that start with XML-, GRP-, and ATR- are identified and a linkage section is constructed (step 806). The variables in the linkage section are configured to reflect the COBOL copybook both in name and hierarchy. The names are prefixed, in the illustrated embodiment, using LS—to represent linkage variables.

In step 808, procedure division statements are generated for each linkage variable. The caller of this module preferably populates the linkage variables before calling this module. Procedure division statements are created to move each linkage variable into the corresponding XML Cobol copybook variable. In the case of arrays, all occurrences are preferably populated.

In step 810, a generic code is appended to compress the XML copybook such that fields represent the actual length of the field. The generic code moves each input XML character to output XML area; however, the leading spaces in the content of each element are truncated in the output XML.

Figure 9:
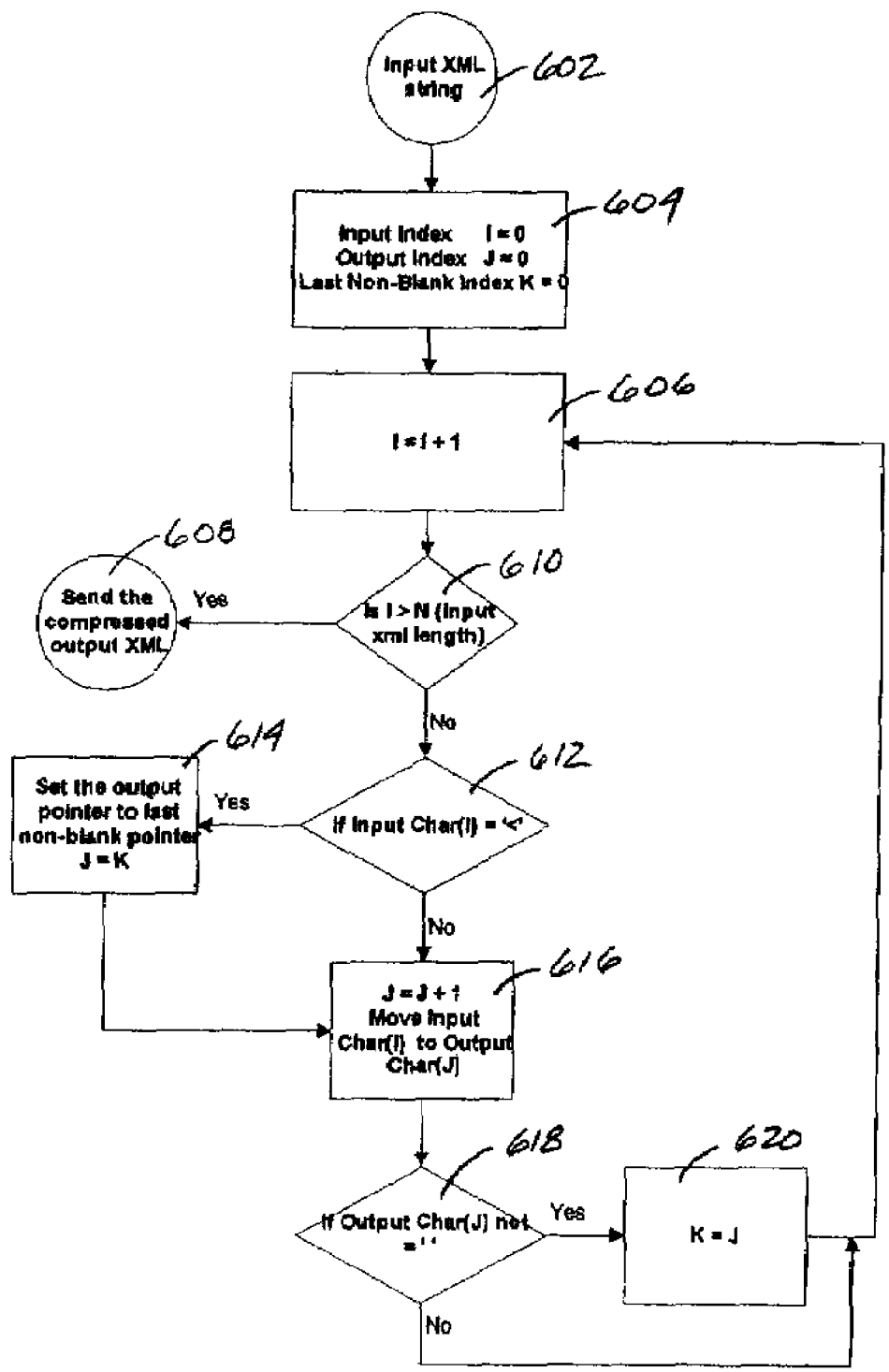
FIG. 9 depicts an exemplary compression method.

To assist this compression logic, which is shown in FIG. 9 and FIG. 10, a non-blank index is maintained that points to the last non-blank character populated in the output XML. Whenever the character '<' that triggers the start of a new element is found, the output position is adjusted to the last non-blank character. More particularly, referring to FIG. 9, the system starts with the input XML string (step 602). After initializing indexes (step 604), the system increments the input index I (step 606). If I>N (where N is the total number of characters in the XML document before compression) (step 610), the system sends the compressed output XML (step 608); if not, then the system continues with step 612 and tests whether the input character is "<". If so, the output pointer is set to the last non-blank pointer (step 614); if not, the output index, j, is incremented, and the input character is moved to the output character (step 616). If the output character is not " (blank), then the index K is set to the output index, and processing continues with step 606. If the output character is ", then processing also continues with step 606, without setting the index K.

For example, the XML tag:
"<tag1> test of tag 1 to delete leading spaces <tag1>"
in the input XML will be moved to output XML as:
"<tag1> test of tag 1 to delete leading spaces</tag1>".

The present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

For the sake of brevity, conventional data networking, application development and other functional aspects of the systems (and components of the individual operating components of the systems) may not have been described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

Any networks used in connection with the present invention (i.e., in the context of a distributed software/hardware system) shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Many of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like.

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. For example, while the present invention has been described in the context of COBOL, the general framework described herein may be used in conjunction with a number of other legacy software languages, e.g., Fortran, PL1, Pascal, and the like. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. An apparatus comprising a processor and a memory storing a program executable by the processor, wherein the program includes computer code for implementing a method for obtaining computer-generated markup language documents using a programming language, the method including steps of:
    creating, using a markup language, a template document including a plurality of tags;
    populating each of the plurality of tags with a value, wherein at least one of the plurality of tags is populated with a maximum tag length value;
    parsing the template document to determine a working storage structure corresponding to the plurality of tags; and
    generating, in the programming language, an API configured to generate, during run-time, a markup language document, and to generate a corresponding set of data elements corresponding to the working storage structure, wherein the generated API includes:
        a definition of the working storage structure including a plurality of API variables,
        code for each tag that participates in an array, and
        code configured to compress the data elements by truncating leading spaces in each data element,
    wherein a dimension of the array can be adjusted upon receiving input from a user interface.

2. The apparatus of claim 1, wherein the programming language is COBOL.

3. The apparatus of claim 1, wherein the markup language is XML.

4. The apparatus of claim 1, wherein the method further includes steps of:
    receiving an input message markup language document;
    extracting input data from the input message markup language document to create extracted input data;
    using the extracted input data in an application program, wherein the application program is written in the programming language; and
    generating markup language documents by use of the API.

5. A system for generating markup language documents, the system comprising a computer apparatus configured to:
    create, using a markup language, a template document including a plurality of tags;
    populate each of the plurality of tags with a value, wherein at least one of the plurality of tags is populated with a maximum tag length value,
    parse the template document to determine a working storage structure corresponding to the plurality of tags, and
    generate an API configured to generate, during run-time, a markup language document and to generate a corresponding set of data elements corresponding to the working storage structure, wherein the API includes:
        a definition of the working storage structure including a plurality of API variables,
        code for each tag that participates in an array, and
        code configured to compress the data elements by truncating leading spaces in each data element,
    wherein a dimension of the array can be adjusted upon receiving input from a user interface.

6. The system of claim 5, wherein the programming language is COBOL.

7. The system of claim 5, wherein the markup language is XML.

8. The system of claim 5, wherein the computer apparatus is further configured to:
    receive an input message markup language document;
    extract input data from the input message markup language document to create extracted input data;
    use the extracted input data in an application program, wherein the application program is written in the programming language; and
    generate markup language documents by use of the API.

9. A computer-readable storage medium storing, in executable form, computer-readable instructions that, when executed by one or more computing devices, implement a method for obtaining computer-generated markup language documents using a programming language, the method comprising:
    creating, using a markup language, a template document including a plurality of tags;
    populating each of the plurality of tags with a value, wherein at least one of the plurality of tags is populated with a maximum tag length value;

parsing the template document to determine a working storage structure corresponding to the plurality of tags; and generating, in the programming language, an API configured to generate, during run-time, a markup language document, and to generate a corresponding set of data elements corresponding to the working storage structure, wherein the API includes:
  a definition of the working storage structure including a plurality of API variables,
  code for each tag that participates in an array, and
  code configured to compress the data elements by truncating leading spaces in each data element, wherein a dimension of the array can be adjusted upon receiving input from a user interface.

10. The computer-readable storage medium of claim 9, wherein the method further includes:
  receiving an input message markup language document;
  extracting input data from the input message markup language document to create extracted input data;
  using the extracted input data in an application program, wherein the application program is written in the programming language; and
  generating markup language documents by use of the API.

* * * * *